United States Patent
Wasser

[11] Patent Number: 5,508,008
[45] Date of Patent: Apr. 16, 1996

[54] APPARATUS FOR PRODUCING OZONE WITH LOCAL AND REMOTE APPLICATION

[76] Inventor: Robert E. Wasser, 4569 Samuel St., Sarasota, Fla. 34233

[21] Appl. No.: 329,893

[22] Filed: Oct. 27, 1994

[51] Int. Cl.$^6$ ................................................ B01J 19/08
[52] U.S. Cl. ........................................ 422/186.07; 422/907
[58] Field of Search ............................ 422/186.07, 907

[56] References Cited

U.S. PATENT DOCUMENTS

| | | | |
|---|---|---|---|
| 1,588,976 | 6/1926 | McBlain | 422/186.07 |
| 1,874,455 | 8/1932 | Conley | 422/186.07 |
| 2,290,376 | 7/1942 | Marshall | 204/316 |
| 2,326,601 | 8/1943 | Arff | 204/320 |
| 2,906,678 | 9/1959 | Trub | 204/317 |
| 3,352,775 | 11/1967 | McNamara | 204/313 |
| 3,565,776 | 2/1971 | Arff | 204/320 |
| 3,842,286 | 10/1974 | Imris | 250/535 |
| 3,899,682 | 8/1975 | Lowther | 250/532 |
| 3,903,426 | 9/1975 | Lowther | 250/532 |
| 4,035,657 | 7/1977 | Carlson | 250/533 |
| 4,214,995 | 7/1980 | Saylor | 250/539 |
| 4,349,511 | 9/1982 | Owen | 422/186.07 |
| 4,863,701 | 9/1989 | McMurray | 422/186.08 |
| 4,886,645 | 12/1989 | Fischer | 422/186.18 |
| 4,909,996 | 3/1990 | Uys . | |
| 5,078,965 | 1/1992 | Pearson | 442/3 |

Primary Examiner—Donald P. Walsh
Assistant Examiner—Daniel J. Jenkins
Attorney, Agent, or Firm—Charles J. Prescott

[57] ABSTRACT

An apparatus for producing ozone for use inside buildings and residences and for purifying water. The apparatus includes a generally flat base and a removable cover in generally sealed contact around the perimeter of the base, the cover and base defining an interior volume. An array of closely spaced, preferably non-contacting, parallel ozone producing cells are mounted atop the base within the interior volume. This array is positioned adjacent an air inlet in a side wall of the cover. Air is drawn into the interior volume through the air inlet and is directed against the array by a fan or blower. A blend of air and ozone produced by the array flows from the array for upward discharge from the outlet. The array includes a plurality of dielectric open-ended tubular members, preferably made of PYREX, held in position within closely mating spaced holes formed in spaced upright non-conductive support panels connected atop the base. First and second formed non-corrosive, conductive tubular shaped screen members are positioned directly against and generally coextensive with the interior and exterior surface, respectively, of each dielectric tubular member. A single a.c. transformer provides high a.c. voltage at low current levels to energize the array to produce ozone. An optional outlet nozzle arrangement, combined with a separate air pump and outlet closure panel, facilitate directing ozone into a container of water for purification.

4 Claims, 2 Drawing Sheets

APPARATUS FOR PRODUCING OZONE WITH LOCAL AND REMOTE APPLICATION

BACKGROUND OF THE INVENTION

SCOPE OF INVENTION

This invention relates generally to ozone generating or producing apparatus, and more particularly to a compact ozone producing apparatus for treating room interior air and for purifying water.

PRIOR ART

It is well known to use ozone for both treating interior room air and for purifying water. Ozone is produced when an electrical current arcs between conductive elements, the electric arch or spark discharging across the conductive elements through air to convert oxygen in the air into ozone.

Two such recently patented devices are known to applicant. One ozone generator is disclosed by Uys in U.S. Pat. No. 4,909,996 which teaches a compartmentalized enclosure, one compartment containing one or more ozone producing elements each comprised of an elongated tubular insulator member, typically glass, and inner and outer electrode members formed of tubular sections of wire mesh. A separate transformer is provided for each of these ozone generating units.

Another device known to applicant is shown in U.S. Pat. No. 4,863,701 invented by McMurray teaching an ozone generating apparatus including an array of closed-ended glass tubes, each containing a conductive rod therein serving as a core.

Several other ozone producing apparatus are also found in the following U.S. Pat. Nos.:

| Marshall | 2,290,376 |
| --- | --- |
| Arff | 2,326,601 |
| Imris | 3,842,286 |
| Fischer | 4,886,645 |
| Trüb | 2,906,686 |
| McNamara | 3,352,775 |
| Arff | 3,565,776 |
| Saylor | 4,214,995 |

The present invention disclosed a uniquely configured ozone generating apparatus for distributing ozone into an interior of a room and for dispersing concentrated ozone into water for purification.

BRIEF SUMMARY OF THE INVENTION

This invention is directed to an apparatus for producing ozone for use inside buildings and residences and for purifying water. The apparatus includes a generally flat base and a compact removable cover in generally sealed contact around the perimeter of the base, the cover and base defining an enclosed interior volume. An array of closely spaced, preferably non-contacting, parallel ozone producing cells are mounted atop the base within the interior volume. This array is positioned adjacent an air inlet in a side wall of the cover. Air is drawn into the interior volume through the air inlet and is directed against the array by a fan or blower which is positioned adjacent an outlet formed in the upper surface of the cover. A blend of air and ozone produced by the array flows from the array for upward discharge from the outlet. The array includes a plurality of dielectric open-ended tubular members, preferably made of PYREX, held in position within closely mating spaced holes formed in spaced upright non-conductive support panels connected atop the base. First and second formed non-corrosive, conductive tubular shaped screen members are positioned directly against and generally coextensive with the interior and exterior surface, respectively, of each dielectric tubular member. A single a.c. transformer provides high a.c. voltage at low current levels to energize the array to produce ozone. An optional outlet nozzle arrangement, combined with a separate air pump and outlet closure panel, facilitate directing ozone into a container of water for purification.

It is therefore an object of this invention to provide a unique compact ozone generating apparatus for discharging ozone into a room.

It is yet another object of this invention to provide an ozone generating apparatus which will also purify water.

It is yet another object of this invention to provide an ozone generating apparatus which produces ozone in controlled limited concentration so as not to exceed specified legal limits of ozone concentration.

In accordance with these and other objects which will become apparent hereinafter, the instant invention will now be described with reference to the accompanying drawings.

DETAILED DESCRIPTION OF THE INVENTION

Figures 1, 2:
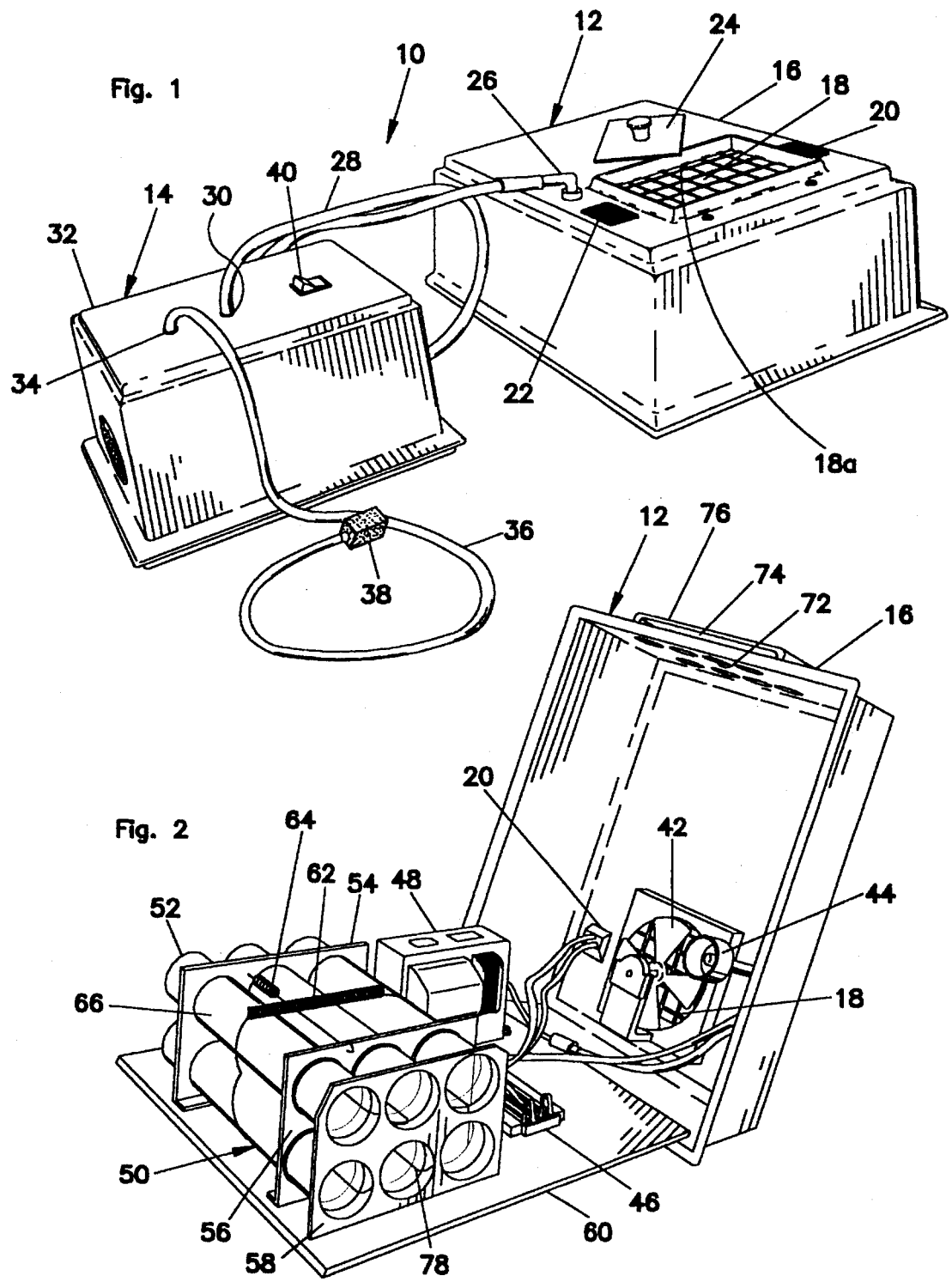
FIG. 1 is a perspective view of the preferred embodiment of the invention.
FIG. 2 is a left side perspective view of the ozone generating apparatus of FIG. 1 with the cover removed.
Figure 3:
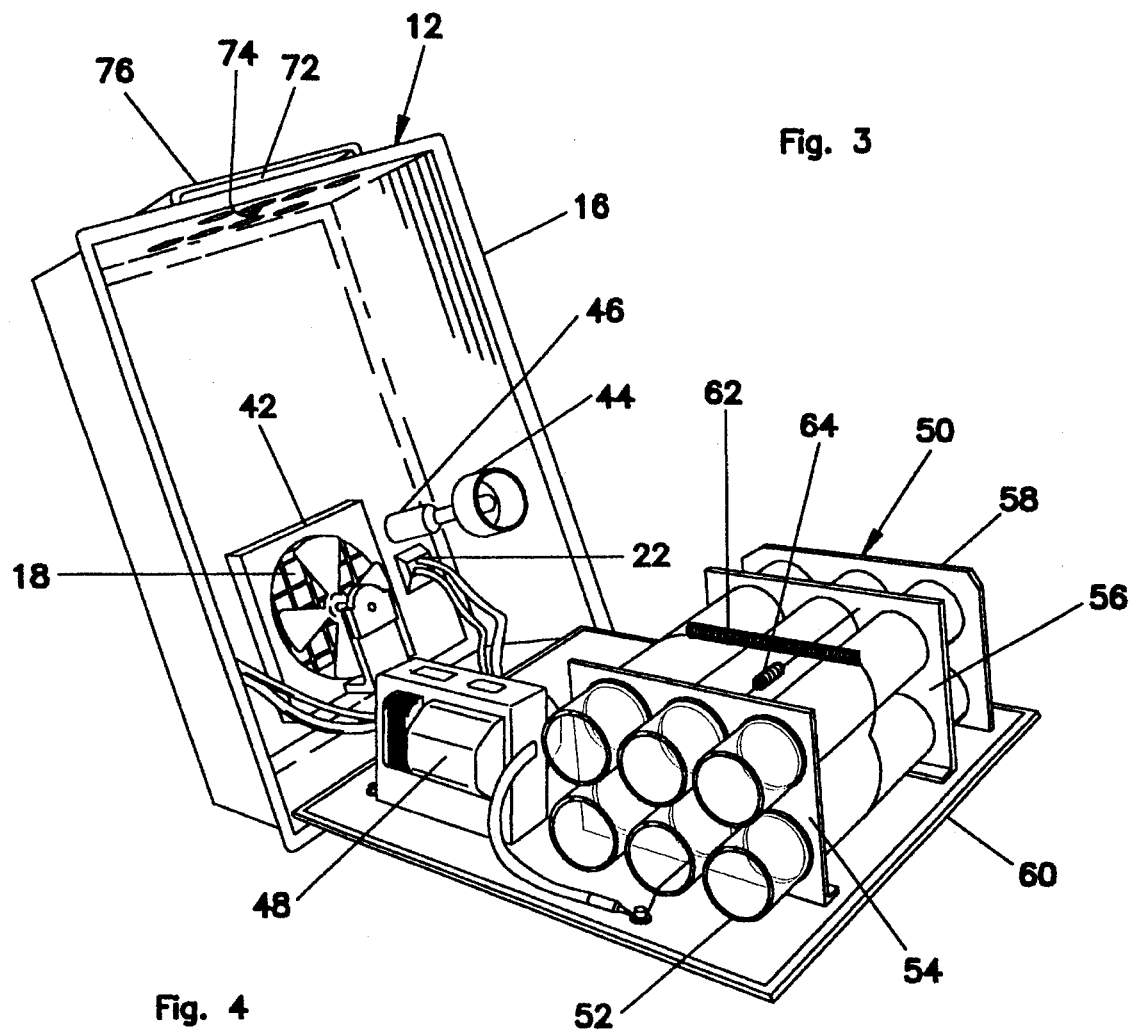
FIG. 3 is a right side perspective view of FIG. 2.

Referring now to the drawings, the preferred embodiment of the invention is shown generally at numeral 10 in FIG. 1 and includes an ozone generating apparatus 12 and an ozone pump 14 for use when purifying water. The ozone generating apparatus 12, as best seen in FIGS. 2 and 3, includes a molded plastic cover 16 having a grill member 18 positioned within a molded outlet 18a. A blower control switch 20 is operably connected to a compact air fan 42 mounted against the inside surface of cover 16 beneath grill 18, while a separate transformer switch 22 is operably connected to a transformer 48.

The cover 16 generally sealably engages around and is supported on the rectangular perimeter of base 60 which is also formed of molded plastic. When so engaged by overlapping molded edges of the cover 16 atop base 60, air entering into the interior volume defined therebetween must do so primarily through an inlet 72 defined by a plurality of holes formed through a side wall of cover 16 which also includes a molded panel 76 for retaining an air filter 74 therewithin.

Electrical power is supplied to the transformer 48 and to the air blower 42 from junction panel 46 via switches 20 and 22 by conventional wiring techniques. The transformer 48 converts conventional 120 V.a.c. (alternating current) into a high voltage low current power supply for the array of ozone producing cells 50. The output voltage from transformer 48 is in the range of 6500 V.a.c. @.0.25 m.a. (milliamps).

Figure 4:
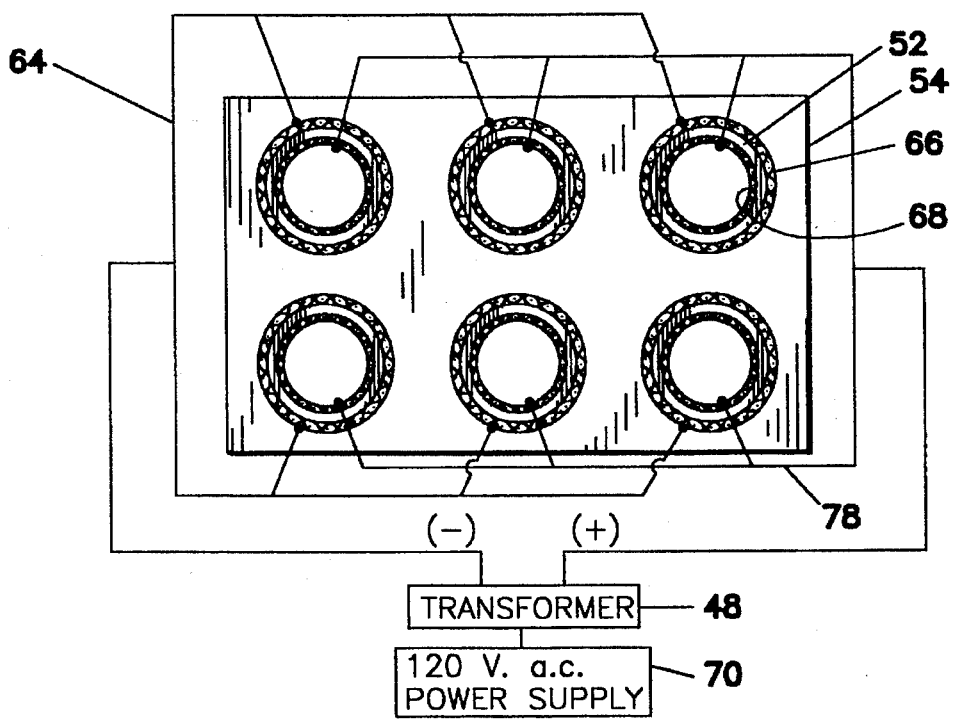
FIG. 4 is a side elevation schematic view of the array of ozone producing cells of the invention.

Construction of the array of ozone cells 50 is best seen in FIGS. 2 and 3 and schematically in FIG. 4. The array 50 includes six uniformly spaced parallel ozone cells, each of which includes a cylindrical dielectric open ended tubular member 52, preferably formed of PYREX glass. The preferred dielectric strength is relatively high and well known in conjunction with PYREX glass. These dielectric tubular members 52 are positioned and held within closely mating holes evenly spaced and formed through upright non-conductive upright support members 54 and 56 which are bolted to base 60. Each of the dielectric PYREX tubes 52 are covered generally along the entire length thereof between support panels 54 and 56 by an exterior tubular shaped non-corrosive screen member 66 formed of 308 stainless steel. After forming into tubular shape, these outer screen members 66 are positioned tightly around the dielectric tubular members 52 and then preferably glued or otherwise secured in place along a ⅛" overlapping seam.

As seen in FIG. 4, a second non-corrosive, electrically conductive tubular shaped screen member 68 is positioned and secured against the inner surface of each dielectric tubular member 52. Again, a conventional adhesive applied in spots along a ⅛" overlap secures this arrangement.

All of the outer conductive screen members 66 are electrically connected one to another and isolated from all of the electrically connected inner conductive screen member 68. To accomplish this, as best seen in FIG. 2, a conductive spring member 62 is wrapped transversely around all of the dielectric tubular members 52 against the outer conductive screen members 66. To electrically connect all of the inner tubular screen members 68, a plurality of elongated U-shaped conductive wire members 78 are slid into adjacent tubular members 52 and between the inner surface of the tubular dielectric member 52 and the inner screen member 68. A non-conductive fence plate 58 positioned immediately adjacent one end of the array 50 secures these wire members 78 from vibrating free during operation.

The positive (+) output terminal of transformer 48, having an input from power supply 70, is connected to a common inner screen member 68, while the negative (−) or ground terminal of transformer 48 is interconnected to a common outer conductive screen member 66. When the system is activated, and air is drawn over the ozone producing array 50, the electrical arching or discharge which occurs within the mesh of inner screen members 68 produces ozone from that entering air.

Factors which determine the concentration of ozone output are the number of ozone cells within the array 50, the surface area, grid and wire size of the inner and outer conductive screen members and the voltage and current applied across these conductive inner and outer screen members by transformer 48. Applicant has found that utilizing six dielectric PYREX tubes having an o.d. of 1.5", an i.d. of 1.34" and a length of 9", in combination with (100) grid stainless steel screen having a wire diameter of 0.010" and a length of 5.5", in combination with the above recited transformer voltage, produces the desired ozone concentration. Ozone concentrations are typically measured, for example, by utilizing an ANSEROS OZOMAT GM by Ozone Engineering of California. Samples are taken from discharge nozzle 26 with closure panel 24 in place and fan 42 off.

In addition to providing ozone into a room air, the invention 10 will also provide concentrated ozone for purifying water. To accomplish this, a removable closure panel 24 fitted over outlet 18a, resting atop grid 18 is provided to temporarily prevent ozone from being discharged from the interior volume of the ozone generating apparatus 12. The blower 42 is deactivated by switch 20, while the array of ozone cells 50 remains activated by switch 22 through transformer 48 as previously described. To remove concentrated ozone from the ozone producing apparatus 12, a discharge noble 26 connected through the top of cover 16 as best seen in FIG. 1 and 3 is provided. The lower end 46 of the discharge nozzle 26 is interconnected to an enlarged downwardly opening ozone pickup member 44 which is positioned in close proximity above the base 60 when the cover 16 is closed as ozone will sink downwardly within the apparatus 10. A diaphragm activated gas pump 14 operably connected to a suitable power supply (not shown) is activated by switch 40. Discharge nozzle 26 is interconnected to the inlet 30 of pump 14 by flexible conduit 28. The outlet 34 of pump 14 delivers the concentrated ozone into flexible conduit 36 which has a porous ceramic or glass stone block 38 connected at the end thereof. Preferably, this filter block 38 is fabricated by first placing powdered glass which will pass through a 100 mesh filter or grid into a rectangular mold and heating to 1200° F. to fuse the particles, yet not melt the glass into a solid. A suitable hose fitting is then bonded by epoxy to one end surface as shown.

As this entire system 10 operates in this fashion, concentrated ozone is dispersed and discharged from the porous ceramic stone 38. By placing the ceramic stone 38 into a container filled with water, the ozone is dispersed uniformly throughout the water for purification.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An apparatus for producing ozone comprising;

a. a housing having a base and a removable cover defining an interior volume therewithin;

b. said housing also having an air inlet and an outlet;
   said housing having an outlet and an nozzle outlet for allowing ozone to be discharged from said housing;
   wherein a closure panel is placed over the outlet when ozone is removed from the housing through the nozzle;

c. an array of parallel, spaced apart ozone producing cells connected atop said base, each said cell comprising:
      i. an elongated dielectric tubular member;
      ii. a first non-corrosive, electrically conductive tubular shaped screen member generally coextensive with and held in position around and against an outer surface of said dielectric tubular member;
      iii. a second non-corrosive, electrically conductive tubular shaped screen member generally coextensive with and held in position against an inner surface of said dielectric tubular member;

d. non conductive support means positioned at each end of said array for holding said array in position atop said base;

e. a source of high a.c. voltage and low current having a positive (+) output terminal in common electric communication with each second screen member of said array and a negative (−) output terminal in common electrical communication with each said first screen member of said array;

f. fan means connected at said outlet for drawing air through said air inlet into said interior volume to produce ozone by said ozone producing cells and for discharging ozone from said outlet;

g. electrical control means mounted on said cover for selectively energizing said fan means and said source of a.c. voltage.

2. An apparatus as set forth in claim 1, further comprising:

wherein said discharge nozzle is connected with one end of a first flexible conduit;

a pump operably connected to another end of said first conduit;

a second flexible conduit connected at one end thereof to an outlet of said pump;

a rigid porous member operably connected to another end of said second conduit whereby ozone passing through said second conduit from said pump enters into said porous member is dispersed therefrom;

a downwardly opening ozone collecting member connected at a lower end of said discharge nozzle within said interior volume, said ozone collecting member positioned in close proximity above said base;

a closure panel removably positioned over said outlet to substantially eliminate ozone discharge from said interior volume through said outlet;

said pump drawing ozone from said interior volume through said ozone collecting member for dispersed discharge from said porous member into a container of water for purification.

3. An apparatus for producing ozone for discharge into an interior of an enclosed room comprising:

a. a housing having a flat lower base for supportive contact with a flat support surface and a removable cover connected around and upwardly extending from a perimeter of said base, said cover and said base defining an enclosed interior volume;

b. an air inlet formed through said cover; an array of parallel, spaced apart ozone producing cells, comprising:

an outlet and an nozzle outlet for allowing ozone to be discharged from said housing;

wherein a closure panel is placed over the outlet when ozone is removed from the housing through the nozzle;

c. an array of parallel, spaced apart ozone producing cells, comprising:
  i. a plurality of elongated dielectric tubular members;
  ii. a like plurality of first non-corrosive electrically conductive tubular shaped for aminous screen members each generally coextensive with and held in position around and against an outer surface of each dielectric tubular member of said plurality of dielectric tubular members;
  iii. a like plurality of second non-corrosive electrically conductive tubular shaped foraminous screen members each generally coextensive with and held in position against an inner surface of each dielectric tubular member, each of said first and second screen members of each said dielectric tubular member aligned endwise one to another;
  iv. two spaced apart non-conductive supported connected atop said base each having a like plurality of evenly spaced apart mounting holes formed therethrough, each sized to snugly supportively receive one end of one said tubular member;
  v. first conductive formable wire means extending between each two adjacent said second screen members whereby all of said second screen members are electrically connected one to another;
  vi. second conductive formable wire means spring biased in position transversely around said array whereby all of said first screen members are electrically connected one to another;

d. said array of ozone producing cells positioned atop said base having one side thereof facing and adjacent to said air inlet, said outlet being positioned in said cover facing an opposite side of said array of ozone producing cells whereby air drawn into said interior volume through said inlet interacts with said ozone producing cells to produce ozone;

e. transformer means having an input thereof operably connected to an a.c. power supply and an output of said transformer means operably connected to each of said first and second screen members, a positive (+) terminal of said transformer output being connected to one said second screen member, a negative (−) terminal of said transformer output being connected to one said first screen member;

f. a fan means connected adjacent said outlet for drawing air through said air inlet into said interior volume to produce ozone by said ozone producing cells and for discharging ozone from said outlet;

g. electrical control means mounted on said cover for selectively energizing said fan means and said source of a.c. voltage.

4. An apparatus as set forth in claim 3, further comprising:

wherein said discharge is connected with one end of a first flexible conduit;

a pump operably connected to another end of said first conduit;

a second flexible conduit connected at one end thereof to an outlet of said pump;

a rigid porous member operably connected to another end of said second conduit whereby ozone passing through said second conduit from said pump enters into said porous member and dispersed therefrom;

a downwardly opening ozone collecting member connected at a lower end of said discharge nozzle within said interior volume, said ozone collecting member positioned in close proximity above said base;

a closure panel removably positioned over said outlet to substantially eliminate ozone discharge from said interior volume through said outlet;

said pump drawing ozone from said interior volume through said ozone collecting member for dispersed discharge from said porous member into a container of water for purification.

\* \* \* \* \*

UNITED STATES PATENT AND TRADEMARK OFFICE
CERTIFICATE OF CORRECTION

PATENT NO. : 5508008
DATED : April 16, 1996
INVENTOR(S) : Robert E. Wasser

It is certified that error appears in the above-indentified patent and that said Letters Patent is hereby corrected as shown below:

In Column 5, lines 36, 37, and 38, delete "an array of parallel, spaced apart ozone producing cells, comprising:".

In Column 5, line 48, delete "for aminous" and insert -- foraminous --.

Signed and Sealed this

Second Day of July, 1996

Attest:

BRUCE LEHMAN

Attesting Officer

Commissioner of Patents and Trademarks